United States Patent [19]

Barsellotti et al.

[11] 3,842,206

[45] Oct. 15, 1974

[54] TRANSPONDER FOR METER READING TELEMETERING SYSTEM

[75] Inventors: John Anthony Barsellotti; Federico Riccardo Laliccia; John Fraser Litster, all of Guelph, Ontario, Canada

[73] Assignee: International Standard Electric Corporation, New York, N.Y.

[22] Filed: Nov. 24, 1972

[21] Appl. No.: 308,973

[30] Foreign Application Priority Data

Dec. 16, 1971 Canada .............................. 130329

[52] U.S. Cl. .............................................. 179/2 A

[51] Int. Cl. ........................................ H04m 11/00

[58] Field of Search ........... 179/2 A; 340/150, 151, 340/172.5; 307/85, 86

[56] References Cited

UNITED STATES PATENTS

| | | | |
|---|---|---|---|
| 3,339,081 | 8/1967 | Borden | 307/86 |
| 3,344,282 | 9/1967 | Baude | 307/87 |
| 3,400,378 | 9/1968 | Smith | 179/2 A |
| 3,564,143 | 2/1971 | Stewart | 179/2 A |
| 3,736,569 | 5/1973 | Bouricius | 340/172.5 |
| R26,331 | 1/1968 | Brothman | 179/2 A |

*Primary Examiner*—David L. Stewart
*Attorney, Agent, or Firm*—James B. Raden; Marvin M. Chaban

[57] ABSTRACT

Disclosed is a system for the sensing of the reading of utility meters, such as gas, electric and water, at a unit connected to a telephone station, and the transmission of sensed data over telephone lines to a receptive data processor. A reed switch senses each rotation of the least significant digit wheel to write in a memory store. Each meter has its own memory, the memory at any time having stored therein an indication of the current meter reading. On a signal received over the telephone line, the memories are used to release their data to a secondary storage network. Data from each meter is then encoded and transmitted in sequence over a special trunk to the data processor, each memory transmitting its data sequentially in a bit stream of predetermined length, each bit being a burst of tone of one or another predetermined frequency. The readout data from the memories is non-destructive in that the current status of each memory is retained in the memory. At the end of transmission of the totality of bits of data, the memory reading and transmission system is reset and de-activated.

7 Claims, 9 Drawing Figures

TRANSPONDER FOR METER READING TELEMETERING SYSTEM

BACKGROUND OF THE INVENTION

In the last thirty to thirty-five years, many patents have issued covering inventions for automatic meter reading. One type of meter-reading disclosed by the art is the type in which a remote meter station automatically dials a preset called party number to access a data receiving unit. The unit sends back a ready-to-receive signal, and data in a meter store (usually mechanically stored) is scanned and sent to the receiver.

The usual approach is to read and transmit data based on units used since the last reading. In systems of this type, the meter wheels themselves generally are scanned on demand as one step in the process.

Another type of reader system causes the central exchange or data processor to access the remote station with which the meter is associated. The station responds, sends back a ready-to-send signal, the processor then indicates that it is ready to receive. Data is transmitted in suitable form, and an end-of-message signal is sent from either the processor or the remote station. It is to this general approach that our invention is directed; the closest art of this type of which Applicants are aware is shown in U.S. Pat. No. 3,400,378 issued Sept. 3, 1968 to L. R. Smith, et al., for Data Acquisition System.

SUMMARY OF THE INVENTION

The meter reading system of the present invention provides the features of sensing of readings of utility meters such as gas, electric and water at a unit connected to a remote telephone station, continuously monitoring the meters, storing the readings in binary form when received, and transmitting the sensed data over a telephone trunk line to a receptive data processor in response to a request from the processor. In general such a system includes three sections: (1) the data processing section, (2) the meter sensor and transmitter section and (3) the interface unit between these two sections. The present invention is directed primarily to an electronic meter sensor and transmitter network, called herein the transponder.

Using the present system, a number of approaches are possible. In a first of these, an added wheel is mounted in each meter housing to rotate with the least significant digit wheel of that meter. A reed switch senses each complete rotation of the added wheel to add a count to the reading stored within a plural bit memory. Another approach would be to connect a reed switch to sense directly the revolutions of the meter wheel for the least significant digit for each meter.

In the present system as shown, each meter has its own memory, the memory continuously monitoring the meter so that the memory at any time has stored therein an indication of the current meter reading in binary decimal form.

On a tone burst signal from the interface unit, the sensor and transmission section is connected to a special trunk to the processor, so that each memory can transmit its data sequentially in the form of a bit stream comprised of bursts of tone of a predetermined base or modulated frequency. The read-out of data from the memories is non-destructive in that the current status of each memory is retained in the memory. At the end of transmission of data representing all meters at the station, a coincidence count terminates transmission, and resets the transponder.

Various safeguard features are provided, such as sensing of duration of power failure and resulting battery voltage level. On battery source dipping below a predetermined value, a meter transmission lock-out latch is activated. Restoration of power subsequent to the latch will not reset the latch. Thus, any improper readings due to failure to record during the low voltage period cannot be sent, and manual reset of the unit and memories is required.

A further safeguard in the system calls for termination of transmission on the telephone station picking up to initiate a call during data transmission. Digit transmission is halted, so that the presence of the incomplete data informs the processor to erase all digits previously sent. In other words, unless the total digit bit count is received, all transmitted digits are erased at the processor. Each memory unit retains its reading after transmission and up-dates the memory as further indications are received from the associated meter.

It is therefore an object of the invention to provide a new and improved meter reading system applicable for one or more meters.

It is a further object of the invention to provide a meter reading transponder which has an electronic memory which is continuously up-dated to maintain an indication of the current meter reading, and which is accessed from a central location to emit a bit stream of data indicative of the reading of that meter.

It is a further object of the invention to provide a transponder for reading a stored indication of the readings of a plurality of meters on request, and for transmitting same as a bit stream of predetermined length, the stream composed of data for each meter transmitted in sequence.

The present invention provides a simplified system of continuously monitoring the readings of a plurality of meters of the usual type with a plurality of rotatable indicator wheel counters per meter. In the system shown, three meters at a location, such as a remote station, are monitored. Data from each meter is stored in one out of four binary decimal form in a memory with four digits per meter. Naturally, other binary codes are possible, for example, two out of five, etc., but have not been shown. In the system shown, each meter thus provides sixteen bits of data to its associated memory. The bits of data read on request from the memory are transformed into a sixteen bit data stream and transmitted in sequence from each meter memory store at each location. With three meters being read, a forty-eight bit stream is sent. The transmission of the last bit resets the memory transmission apparatus. A counter at the processor (not shown) counts the bits also for control purposes. Although not shown, the processor will reject bit streams less than the full length in any manner known in the art.

DESCRIPTION OF THE PREFERRED EMBODIMENT

Figure 1:
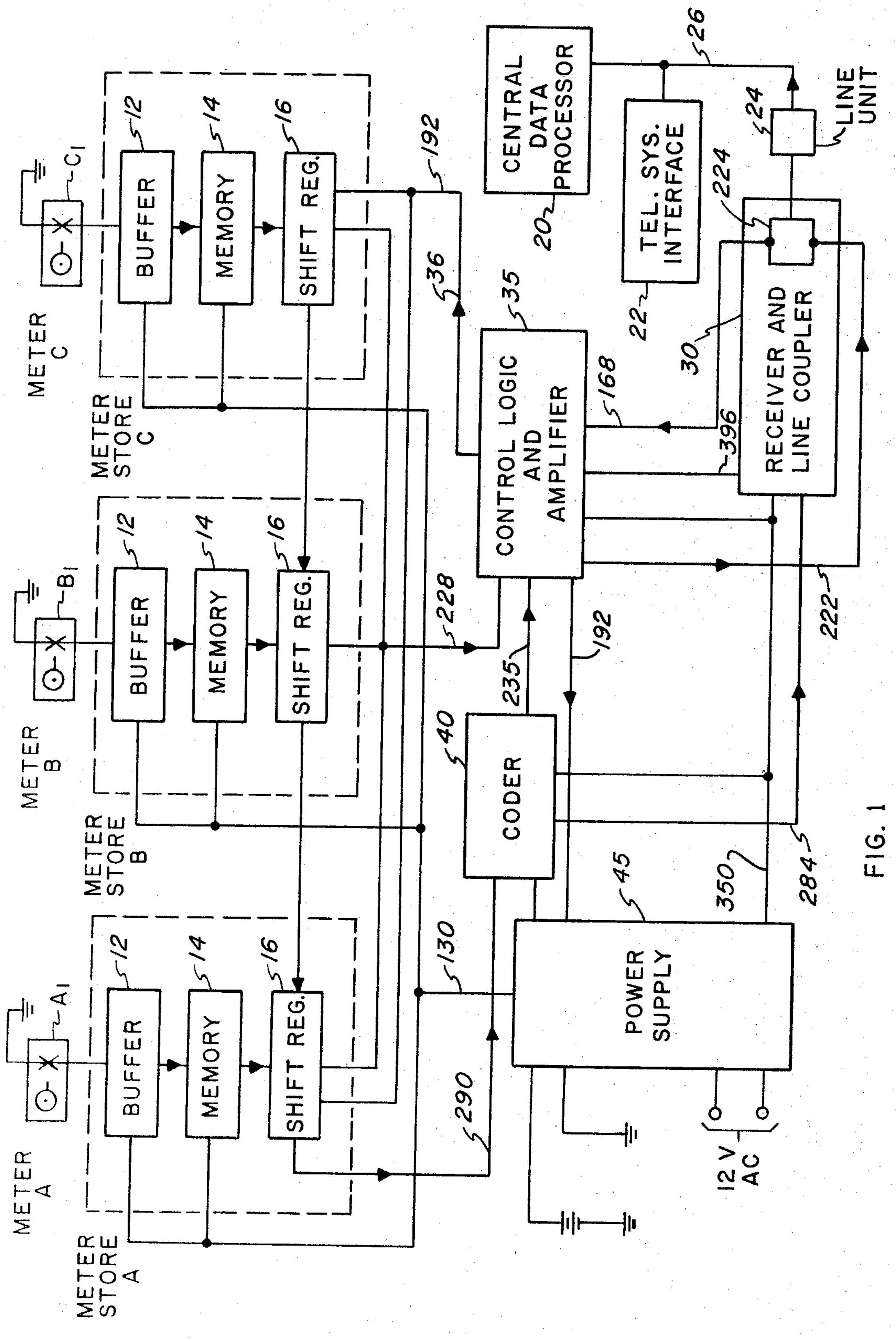
FIG. 1 is a schematic block diagram of the circuit of the transponder of our invention.

FIG. 1 is a block diagram of a transponder employing our invention as applied to three meters shown schematically as boxes labelled Meter A, B and C with a single electrical contact or switch in each, labelled A1, B1 and C1 respectively. The meters are conventional utility meters as are well-known in the art, and may for example meter the flow of gas, water and electric (picking the three most common metered utilities).

Each meter, as is well known, may have one or a plurality of discs or wheels, one of which is rotated one revolution to indicate the flow of one unit quantity of the metered material. Where a plurality of discs are used, the discs co-operate to count, usually in decimal form, employing a unit wheel, a tens wheel, a hundreds wheel, and a thousands wheel. By either providing an extra wheel or by applying a reed switch or the like to the units or least significant digit wheel, a count coincident with that of the meters may be generated within an electronic individual counter to each meter.

Thus, for each meter, there is providing a counting and memory apparatus indicated as meter stores A, B and C. Each meter store includes a buffer circuit 12, a decade memory 14, and a shift register 16. Preferably the memory and registers would be integrated circuits of any suitable type. For each operation of the meter switch, for example, Switch A1, a pulse or signal passes through the buffer 12 stage to the four digit memory 14. Memory 14 may include four stages (one for each digit) where the single pulses are summed into simple four bit binary decimal count in each stage. The data stored in the memories is continually updated by the periodic operation of the meter switch contact, such as A1 to maintain a reading in each memory coincident with reading of its meter. The reading is stored in the register as sixteen bits of data per meter — four digits and four bits per digit. Shift register 16 is normally inactive, and when activated, reads the data from the memory for transmission in sequence therefrom.

When it is desired that the meter readings be collected or transferred to a Central Data Processor 20, the telephone system interface unit 22 transmits a signal to the selected line or station unit 24 over a special trunk line 26. The station units to be read may be selected sequentially or in any desired order, the selection process being outside the scope of the present invention. However, the transponder at one station unit is read at a time on a signal from the processor. The initiating signal or enabling signal received by the transponder is a burst of predetermined tone such as 697HZ, the tone being of sufficient duration to activate the transponder. The main requirement of an initiating tone burst is that it be a frequency distinct from that which would trigger the ringer of the telephone station associated with the selected line, one which may readily be sensed and one which will not cause responses other than that of the transponder. The tone burst is amplified in the receiver 30 and checked for frequency and amplitude. A signal passing these tests is received in the logic circuit 35 for testing the duration of the signal and acting thereupon.

Within the transponder, the logic circuit 35 responds to a valid signal to provide a triggering pulse to provide power to the system and to send a pulse on lead 36 to load the data from the memory to the shift registers 16. The coder 40 is energized by the triggering pulse to transmit clock pulses to trigger the shift registers for read-out of data therefrom. Read-out is non-destructive of the information stored in the memory counters.

Data is read out of the shift register, and passed to coder 40 to emerge as either pulses of either a first or second frequency. A binary zero signal from the register will be converted into a signal of a base frequency, while a binary one will be converted to a signal of modulated base frequency. These signal pulses are amplified, through the receiver 30 and are sent out on trunk 26. The data bits are transferred serially from meters A, B and C in sequence totalling forty-eight bits of data.

A counter within the control logic counts the pulses and at the end of transmission of forty-eight pulses, resets the transponder and causes the deenergization of the coder and shift registers and portions of the logic circuit.

A number of features not apparent from the block diagram will be mentioned briefly at this time and discussed more fully in connection with the explanation of the more detailed drawings.

First when data transmission for a station is to be initiated, a busy condition from the station will be transmitted to the interface circuit 22 and the station will be passed temporarily. No showing of the apparatus for this feature is shown.

Second, if the station is associated with the transmitting transponder goes off-hook during data transmission, the transponder will immediately stop all data transmission so that the processor will reject the partial data (less than forty-eight bits). The purpose of this stoppage and erasure is to minimize false readings due to random or external signals. The probability of this condition occuring is slight due to the relatively short duration of data transmission, i.e. approximately one second. Further, the time of day selected for transmission is usually during off-peak periods, such as late at night to provide minimum interference with telephone service and to even traffic distribution in the system.

A further feature covers the prevention of transmission of false signals due to voltage disruptions at the station. Each transponder is equipped with a power supply shown as block 45 in FIG. 1. The normal power to this unit is D.C. current supplied by a battery. An A.C. power source with rectifier is provided to maintain the charge on the battery. In the normal condition (non-transmission of data) the shift registers, clock generator, tone oscillator and tone amplifier are not energized. Only in response to the data request signal from the processor are these elements operated. This operation only on demand considerably minimizes the power requirements and drain on the system.

If a power shutdown occurs and continues for a prolonged period, the battery, of course, will be incapable of continuously powering the system for transmission at the required potential levels. This incapacity is sensed so that when the normal current supply is restored, the transponder is latched against transmission of data after power is restored to the system. No reply will be given to a request from the processor for data, thereby indicating a need for manual resetting of the memories and reset of the power latch manually.

. During shorter duration power failures, the battery will maintain the necessary voltage to properly power the memories so that the count stored in the memories will agree with that of the meters.

Figure 2A:
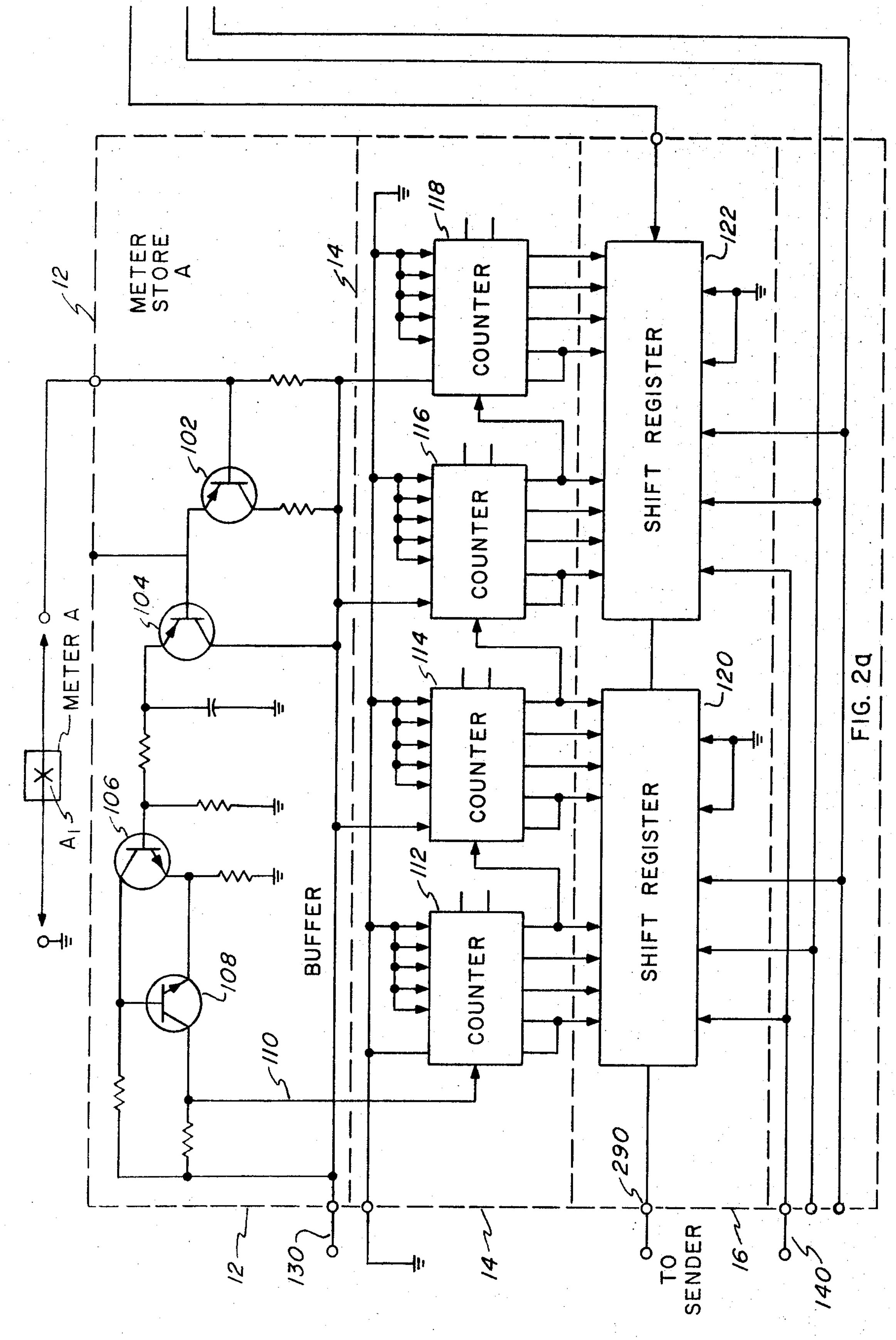
FIG. 2*a* is a block diagram of the apparatus of a representative one of the meters.
Figure 2B:
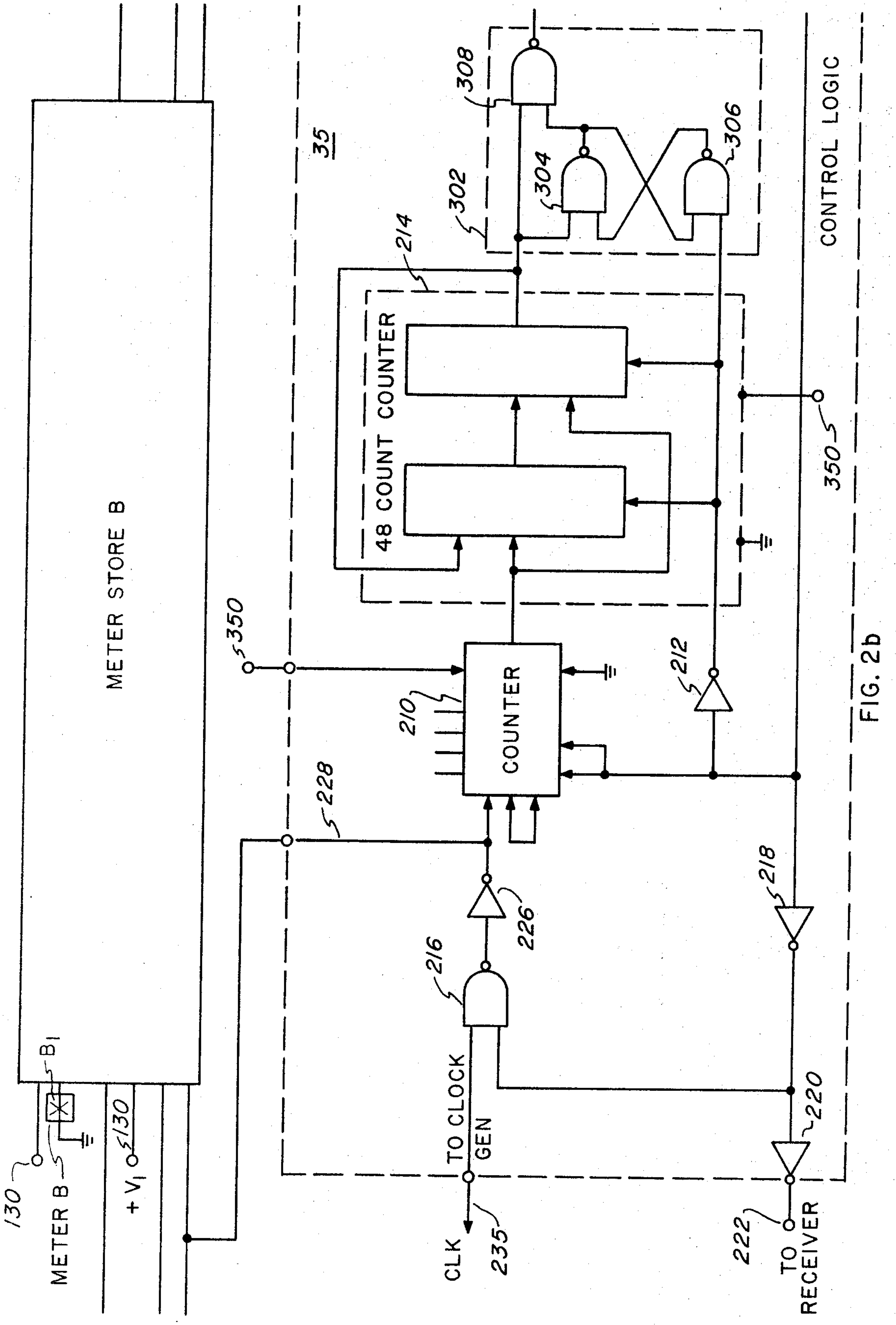
FIGS. 2b and 2c show blocks representing meter stores similar to FIG. 2a, and a detailed schematic circuit drawing of the control logic used.
Figure 2C:
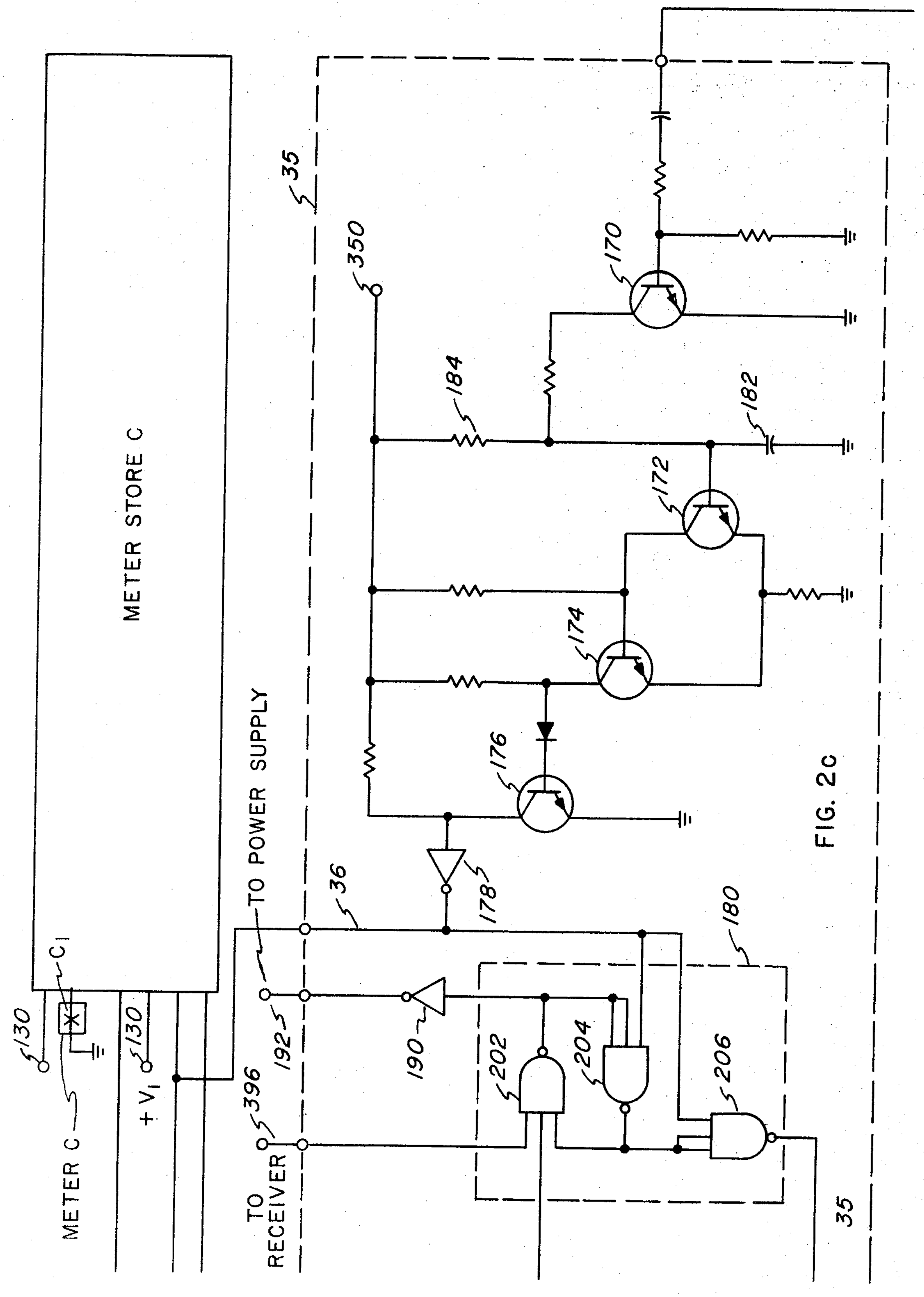
Figure 2D:
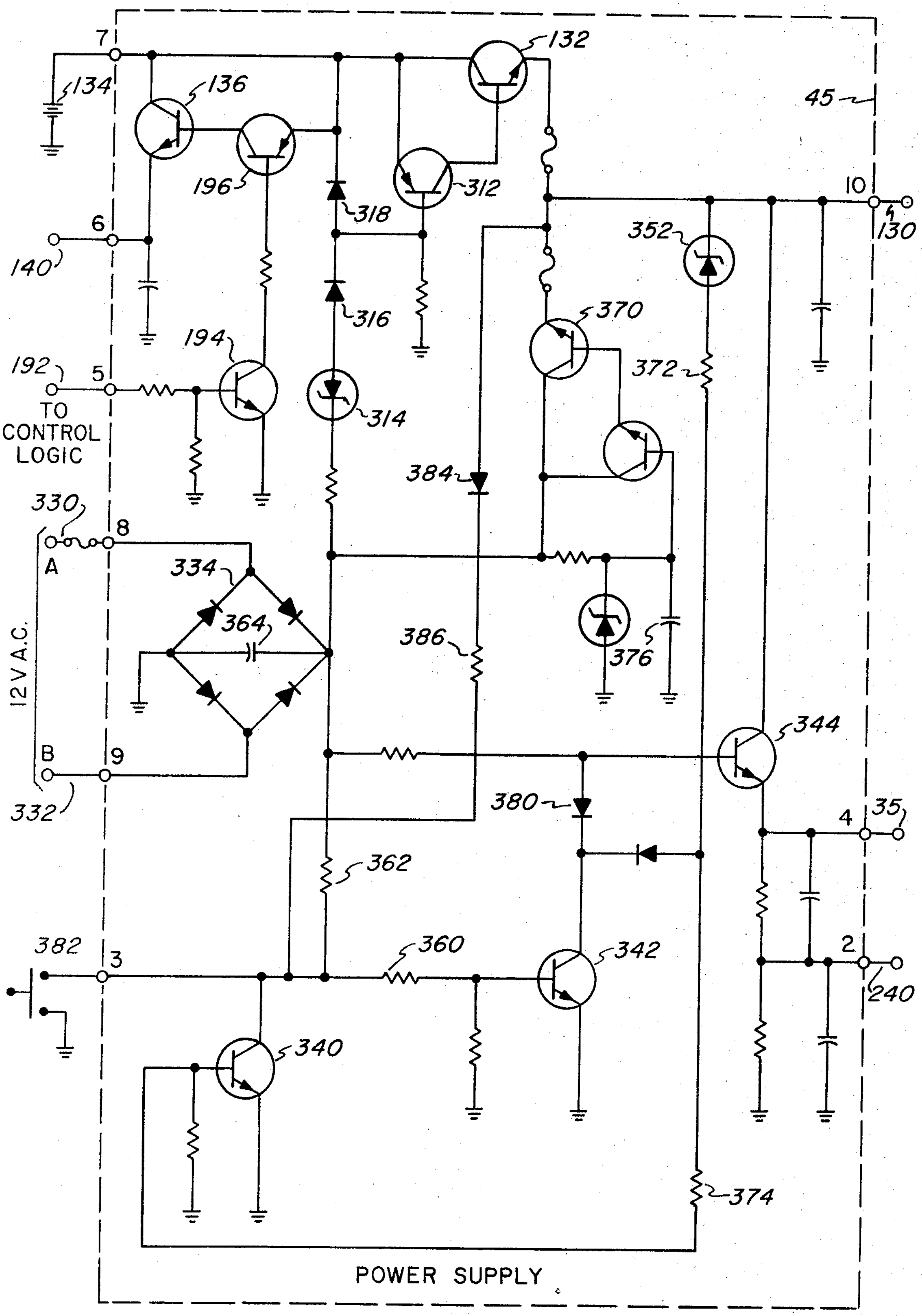
FIG. 2d is a schematic circuit drawing of the power supply and control circuit used.
Figure 2E:
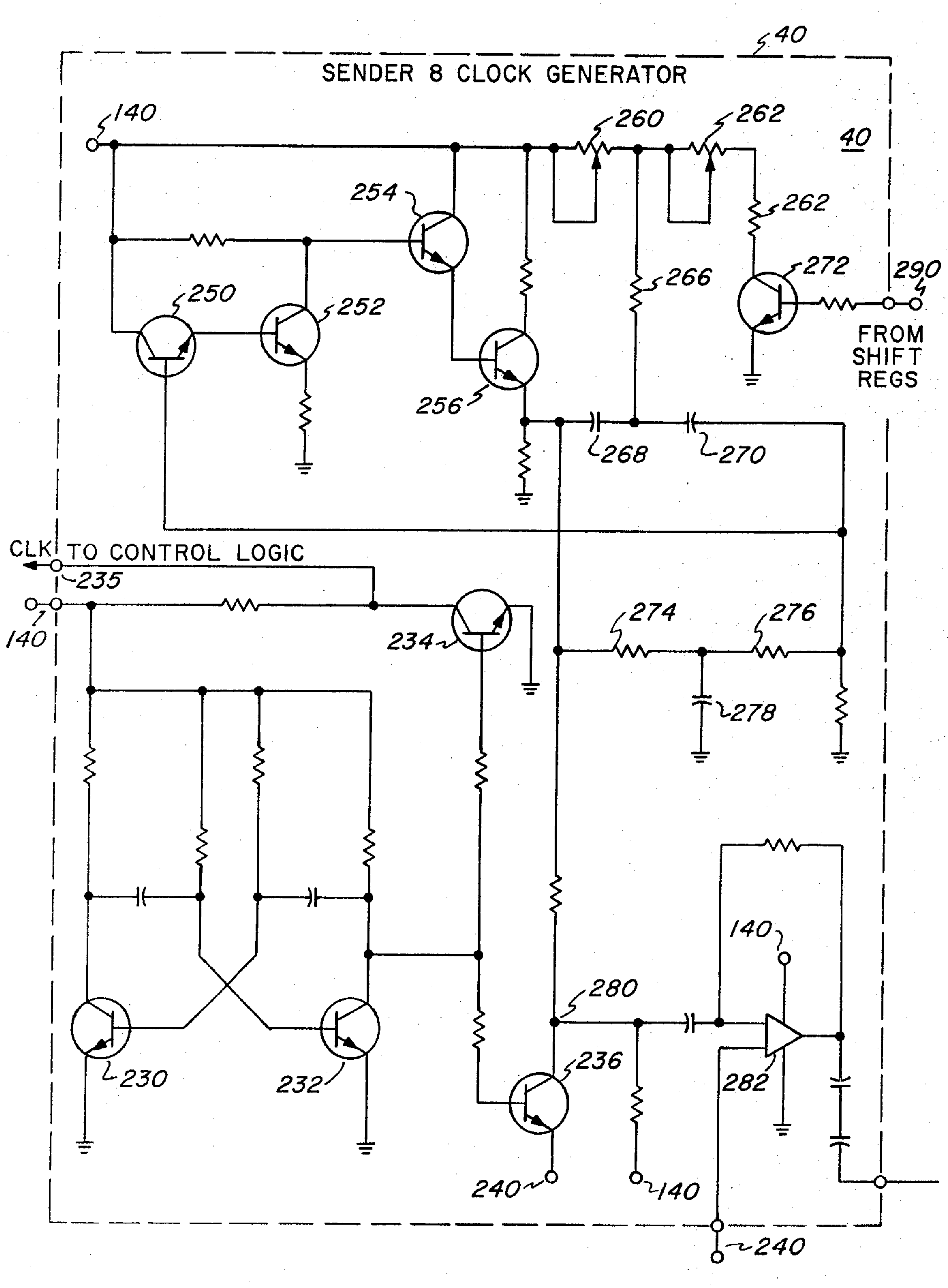
FIG. 2e is a schematic circuit drawing of the coder which includes a clock generator and oscillator circuit used.
Figure 2F:
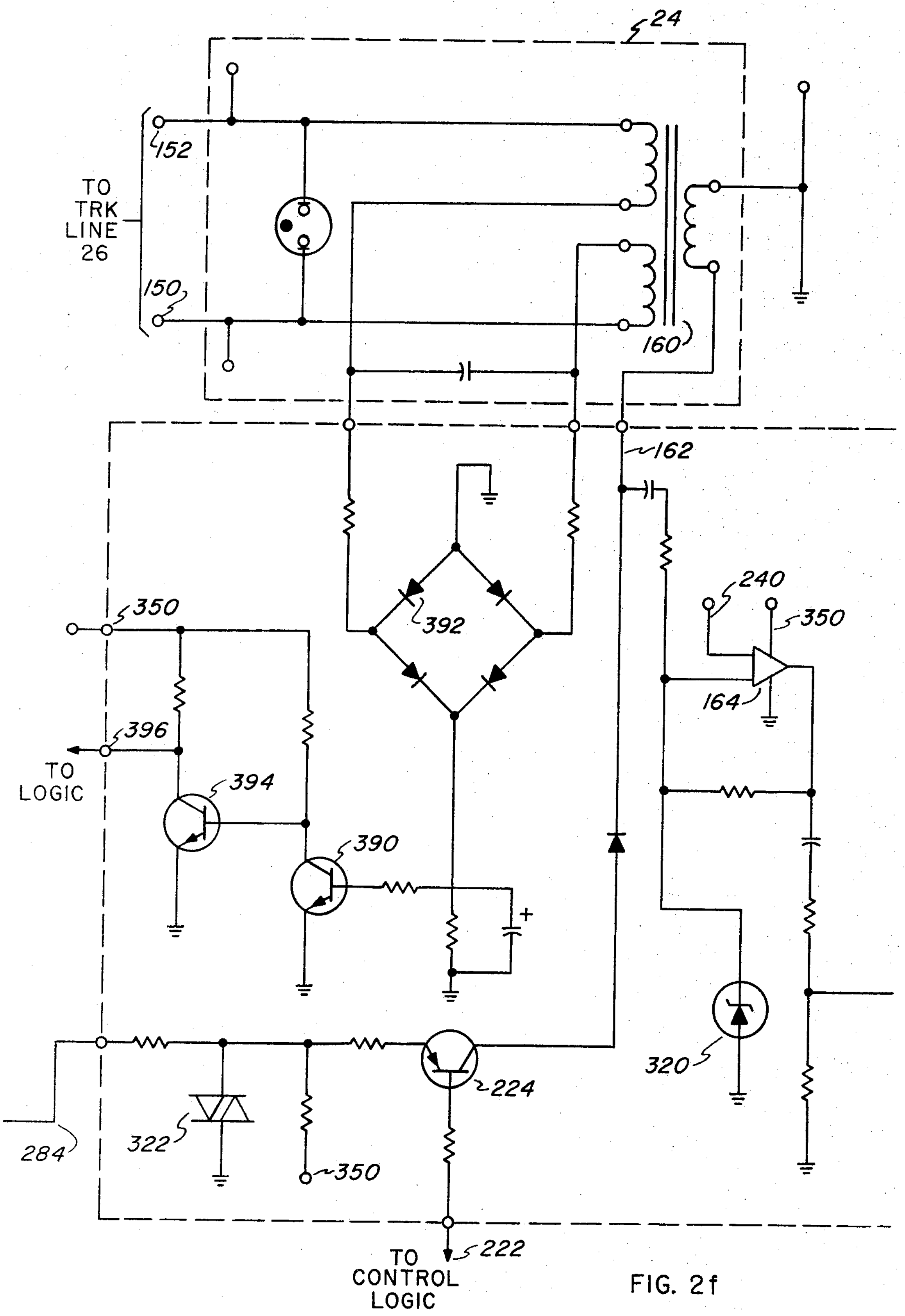
FIGS. 2f and 2g are schematic circuit drawings of the transmission circuit used.
Figures 2, 2G:
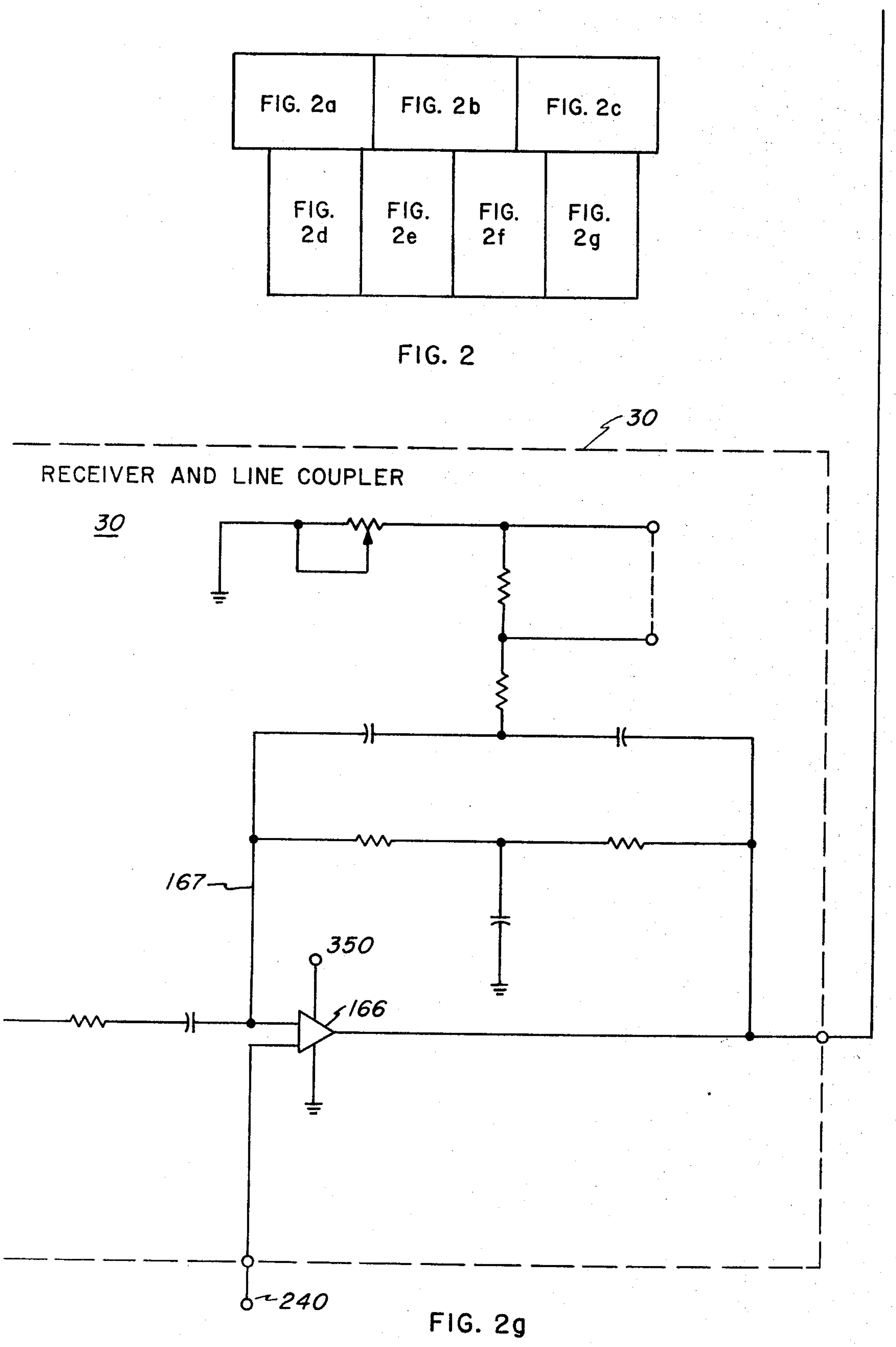
FIG. 2 is a block diagram of positioning the more detailed drawings of FIGS. 2*a* through 2*g* of the transponder of FIG. 1.

In FIGS. 2*a* – 2*g*, we show in greater detail the circuits of the transponder of FIG. 1. In FIG. 2*a* we show a typical meter store A for constantly monitoring the readings of meter A. The meter store is driven by input pulses from ground through meter contacts of A1 of the first meter A to the input of buffer stage 12. As mentioned previously, meter contacts A1 are normally open and are closed by a reed switch or the like sensing the completion of a rotation of the lowest significant digit wheel on the meter.

The ground pulse from contact A1 is fed to base of input transistor 102 to shape and time a pulse as it passes through transistors 104, 106 to output transistor 108. The resultant pulse is fed on lead 110 to units memory stage 112. Memory stage 112 is a four-bit decimal memory which adds received digits and indexes tens memory stage 114 decimally. Hundreds memory 116 and thousands memory 118 each are identical to the units and tens memory so that for each meter, the reading at any one time is comprised of four four-bit indications as stored in respective memory stages. Connected to each meter memory 14 is a shift register network 16 comprised of two parallel stages 120 and 122, stage 120 serving the units and tens memory 112 and 114 and stage 122 serving the hundreds memory 116 and the thousands memory 118 for Meter A.

In the usual situation, the memories count and store an indication of the meter revolutions representing the meter readings. The shift registers are normally maintained de-energized. The meter stores B and C are identical to meter store A, as described, each of these being responsive individually to the readings of the respective meters B and C. Thus, at any time, the data stored in the memories of meter stores A, B and C will be in agreement with the readings of the respective meters A, B and C.

The meter memories and buffers are normally powered by D.C. voltage over the positive voltage lead 130 over a path within a power supply 45 through the normally conducting transistor 132 and battery source 134. Transistor 136 is normally maintained in a non-conducting state so that no power is transmitted over lead 140 to shift registers 120 and 122 and to the remaining circuits. Thus, only the buffers and memories along with portions of the receiver 30 and logic circuit 35 are normally energized. Switching on of transistor 136 and energizing the remainder of the circuit only occurs in response to a request from the central processor.

When the Central Data Processor 20 determined that the meters at a location are to be read, a signal is sent to the interface unit 22 to seize a trunk 26 and to suitably access the station or line unit 24 individual to the meter transponder as shown herein. A triggering signal is generated, the signal being a pulse of desired frequency, such as 697HZ. As mentioned previously, the pulse will not activate the ringer of the telephone station associated with the transponder.

The triggering signal is received in receiver 30 over T and R leads 150 and 152. The signal is transmitted through transformer 160 to its secondary output lead 162. The signal from the transformer secondary is received by operational amplifier 164 which transmits a signal to tuned amplifier 166 only when the signal input amplitude is above a predetermined level. The tuned amplifier which is connected over lead 167 to a Tee network is in the nature of a band pass filter, transmits the received signal when the signal is of the proper frequency to lead 168 directed to control logic circuit 35. In the logic circuit, signal is fed through amplifying transistor 176 and to inverting amplifier 177. The signal thereby produces a plurality of effects, the first and foremost being to change the state of latch gate 180 and to latch the multiple gate in the operative condition.

Within the network previously described (from input amplifier 164 to inverting amplifier 178), the signal is checked for amplitude, frequency and duration. On receiving a signal of proper amplitude, amplifier 164 is triggered to produce a square wave output. The received signal is then sent to the tuned amplifier 166 to provide the frequency test. The Schmitt trigger along with the R-C effects of capacitor 182 and resistor 184 provide a test of the signal duration.

The logic state which appears at the output of the inverting amplifier 178 while the tone signal is present is also transmitted to inverting amplifier 190 and lead 192. The signal on lead 192 is fed to the base of transistor 194 in the power supply causing this transistor to conduct. Conduction of this transistor turns on the power switch comprised of transistor 196 and 136 and connects battery from source 134 to power lead 140. Power lead 140 now energized, provides power for the shift registers, the clock generator and the transmission circuits.

In addition, the signal caused by the start tone received at inverting amplifier 178 is transmitted over lead 185 to shift registers 120 and 122 of each meter store over their load input lead 36. In each meter store, memories shift data simultaneously to the shift registers reflecting the reading of the respective meters, during the pendency of the start signal.

At the end of the start tone, amplifier 178 restores to its original state. Within latch 180, gates 202 and 204 remain latched in their "ON" state, while gate 205 restores to its original "OFF" state. This condition change signal is transmitted to bit stream counter 210, and over a path through amplifier 212 removes the reset condition from bit stream counter 214. Gate 216 is enabled by the change signal from 206 transmitted through amplifier 218, awaiting the start of an output bit stream.

These counters 210 and 214 provide a master count of the bit stream emitted by the shift registers to produce an internal end of stream signal when 48 bits of data have been sent. However, at the end of the initiating signal, the counters are enabled awaiting the start of the data output. The signal through amplifier 218 is further amplified and inverted at amplifier 220 and fed to lead 222. Lead 222 transmits this signal to the base of switching transistor 224 in the receiver circuit. This transistor conducts to provide a path for the data bit stream over lead 162 to the secondary of transformer 160.

Within the coder 40, the energization over power lead 140 starts both a clock generator and a base frequency oscillator into operation.

The clock generator function is performed by an astable multivibrator comprised of transistors 230 and 232, triggered by the input of D.C. voltage on lead 140. The multivibrator has a cycle of approximately 25 milliseconds and during each cycle, emits a clock pulse whose duration is approximately 60 percent of the cycle. The multivibrator output is transmitted to the base of buffer transistor 234 to cause the transistor to conduct and isolate the clock generator load from the astable output. With transistor 234 conductive, ground is connected directly to lead 235, as will be explained. The clock pulses and this transistor are conductive during each pulse. Transistor 236 shorts to ground during the off portion of the clock cycle grounding lead 240 during the off portion of the clock cycle. The purpose of this grounding will be explained more fully later.

The oscillator section of coder 40 is formed by transistors 250, 252, 254 and 256 operated in conjunction with twin tee networks including resistors 260, 262, 266 and capacitors 268 and 270 along with resistor 264 and frequency shift transistor 272. A Tee network of resistors 274 and 276 with capacitor 278 determine the frequency of operation of the oscillator. The oscillator is transmitted to terminal 280 at the input of data output amplifier 282. The oscillator produces a base frequency of 2025HZ, and when transistor 272 is conductive resistors 260 and 262 are enabled to shift the output frequency to 2225HZ.

The triggering input to the base of transistor 272 is received on lead 290, the output lead from the shift registers. Transistor 272 responds to bits of information or the absence of same (binary ones and zeros) from the shift registers. A positive pulse on lead 290 turns transistor 272 on to produce 2225HZ output to terminal 280, and an absence of pulse produces a 2025HZ output on that lead. The clock generator operates transistor 236 for a period of 40 percent of each pulse cycle to short the oscillator ouput to ground during that period producing a silent or inactive output to amplifier 282. During the remaining 60 percent of the cycle, transistor 236 is off and the resulting frequency 2025HZ or 2225HZ is passed as a bit of data to amplifier 282. In this manner, the reading of meter A is sent as a stream of sixteen bits, following which the data from meter store is read and transmitted.

As mentioned previously, power is applied to the system in response to the start tone, application of power causing data from the memories to load the shift registers. The end of the start tone enables the data transmission switching transistor 224 in the receiver to pass data to the line 26.

Clock pulses, as mentioned previously, are generated by the coder and sent to the shift registers through AND gate 216 in the logic circuit. The bits of information on lead 290 (binary ones or zeros) either do or do not trigger transistor 272 to either modulate the base frequency or allow the base frequency alone to pass to output amplifier 282 to the trunk. The clock pulses cause transistor 236 to ground 40 percent of the period of each cycle hence during 60 percent of each clock pulse period amplifier 282 passes a signal of either the modulated or unmodulated frequency to the trunk.

Clock pulses on lead 235 also pass through gate 216 to counters 210 and 214 to count the generated clock pulses and the stream of bits transmitted to the trunk line 26.

When the transmitted data bit stream and the clock pulse count reach thirty-two, a signal is transmitted from counter 214 to latch gate 302, to reset the latch gates 304 and 306 to prepare gate 308. When the count at counter 214 reaches thirty-two, all data has been read from the A and B meter stores, and thereafter data from store C begins to be read. At the end of forty-eight bits of data, all data having been read out, counter 214 feeds a second signal to gate 308 resetting latch gate 302 and gate 202 in latch 180. On lead 192, the reset restores transistor 194 to shut off transistor 132 and removes power from the circuit. Restoration of the latch 180 provides a turn off signal to be sent to switching transistor 224 in receiver 30 completing the shut down of all circuit elements outside the stores and receiver.

Within the circuit for its normal operation, a number of safeguards are provided. As a first of these, transistors 132 and 312 of the power supply form a power regulator with Zener Diode 314 and diodes 316 and 318 to maintain the proper operating voltage level to lead 130, a suitable voltage being +5 volts D.C.

Within the receiver 30, protection is provided for input amplifier 164 in the form of zener diode 320 which clamps the input to a suitable voltage which may be approximately 6.5 volts D.C.

As mentioned previously, the change of state occasioned by the end of the 697HZ enabling pulse transmitted through amplifier 218 also passes through amplifier 220 and lead 222 to the base of transistor 224 switching this transistor on or conductive. This transistor 224 on conduction switches lead 162 into its transmission mode to transmit data signals from the transponder over trunk 26 to the central processor. Transistor 224 must remain conductive to pass data over its emitter collector path.

Further, the end of tone signal transmitted through amplifier 218 enables AND gate 216 awaiting the start of clock pulses on lead 228. Lead 228 provides the read-out control signals to the shift registers, the first such clock pulse starting the transfer of bits of data on lead 290.

Within the coder 40, protection for data output amplifier is provided by a varistor 322 in its output circuit, the varistor limiting line voltage to approximately 10 volts. In the emitter path of switching transistor 224, series diode 324 provides a degree of protection against line surges and the like.

Within the power supply 45, under normal circumstances, an input voltage of +12 volts A.C. is received over leads 330 and 332. The voltage is rectified in bridge rectifier 334 to maintain a charge on battery 134. The rectified input maintains the charge on battery 134. The rectified input also maintains transistor 340 on and transistor 342 off. With transistor 340 on and 342 off, transistor 344 is maintained conductive to complete a path from the voltage source lead 130, through transistor 344 to lead 350. Connections from this lead are made to suitable terminals in the receiver 30 to provide bias for amplifiers 164 and 166, to transistor 224, and to the control logic circuit 35 for transistor bias. Power on lead 350 is transmitted both when the transponder is transmitting and when the transponder is idle, to maintain the receiver 30 operative and ready for the initiating or enabling signals from the processor.

When A.C. power fails, the battery continues to power the system as necessary, and the transponder will respond to an input signal provided the battery voltage level is sufficient to power the entire unit.

In a situation of prolonged power failure or other power disruption, the voltage from battery source 134 may drop below a predetermined threshold level which will cause zener diode 352 to shut off. Shut off of this transistor removes the base drive to transistor 340 which then turns off. Transistor 342 previously described as off, remains in that condition so that both transistors 340 and 342 are off.

When power is restored, after a low voltage condition, transistor 342 will turn on before transistor 340. The reason for this sequence is as follows: when A.C. power is restored to the power supply, transistor 342 receives its base drive through resistors 360 and 362 and bridge rectifier 334 at a time when the voltage across capacitor 364 of the bridge rectifier reaches approximately 1.2 volts. Transistor 340 will only switch on when the voltage across the capacitor reaches approximately 4 volts, over a base drive through transistor 370, zener diode 352 and resistors 372 and 374. This operating sequence (transistor 342 operating before transistor 340) is ensured by providing a series path through the emitter-collector of transistor 370 from the A.C. source to the base of transistor 340; transistor 370 will not switch on until the capacitor 376 has charged, a condition designed to occur after the voltage level has passed the firing level of transistor 342.

Once transistor 342 has switched on, ground from transistor 342, and diode 380 keeps transistors 340 and 344 from operating. With transistor 344 nonconducting, no power is transmitted to the receiver over lead 350, and hence no response is possible by the transponder.

With transistors 340 and 344 off, the transponder must be manually reset by depression of switch 382. Closure of this switch places ground on the base of transistor 342 shutting it off and allowing transistor 340 to turn on restoring transistor 344 to conduction to provide bias for the receiver and logic circuits. By requiring manual reset, presumably by service personnel, the same personnel can reset the meter stores to agree with the meter readings, thus no false readings due to the power failure will be sent to the central data processor.

A still further safety precaution in the event of power failure is provided. In the event of a power failure sufficiently long to trigger the power latch, as noted above, transistor 342 will operate latching transistors 340 and 344 against operation. The duration of a power failure, of course, is determined by the resultant voltage level drop. Any such low voltage for prolonged periods will provide incorrect and inaccurate readings in the meter store and inaccurate signals as transmitted, thus the need for manual reset which presumes setting of the meter readings stored on the memories at that time.

However, it is possible that after a power disruption sufficiently long to cause the latch transistor 342 to operate when power is restored, there may be a second failure. If the second disruption is of comparatively short duration, the voltage level of the system will not have fallen below the latch operating level, so that steps must be taken to ensure that transistor 342 operates before transistor 340. This sequence is effected by the imposition of diode 384 and resistor 386. The serial path through these components between the base of transistor 342 and power lead 130 will provide a direct voltage source to this latching transistor to re-operate it prior to transistor 340. Without this last mentioned feature, a second short duration disruption would mask the earlier power disruption and would lead to improper readings.

As a feature mentioned previously, the picking up of the handset at the station will terminate data transmission. The means for acomplishing this reaction is as follows: Normally the voltage on the telephone line as indicated by terminal leads 150 and 152 to the trunk, is about 48 volts D.C. With voltage approximately at the normal level, within receiver 30, transistor 390 will remain conductive as maintained by rectifier bridge 392. When the handset is picked up and the station goes off-hook, the voltage drops below the hold level of transistor 390 which is about 30 volts. With line voltage below the hold level, transistor 390 restores and transistor 394 switches on. Transistor 394 switching on produces a signal on lead 396. This signal on lead 396 restores latch gate 202 shutting off power to the system on lead 192 and thereby producing a premature end of transmission. The central data processor is designed to erase all data transmitted when less than the full message bit stream has been received. The shift registers reset and the stream counters 210 and 214 restore also. As mentioned previously, the chances of this occurring are slim, since data transmission will be completed in about one second, the data transmission occurring only once a week or once a month, at off-peak hours.

What we claim is:

1. A telemetering transponder for transmitting data to a trunk line, said transponder comprising: means operable by a meter for providing periodic monitoring signals indicative of periodic changes in the meter reading, continuously active memory means responsive to said signals for storing a a continuously up-dated indication of the reading of said meter, means responsive to an initiating signal received over said trunk line for enabling the non-destructive read-out of said stored indication from said memory means to a temporary storage means, said temporary storage means normally inactive and activated responsive to said initiating signal, encoding means, said encoding means activated by and responsive to said initiating signal to read-out data stored in said temporary storage means and to code said data into a message comprised of a predetermined number of bits representative of said stored indication, means for transmitting said message from said encoding means to said trunk line as a series of pulsed bits and means responsive to the end of transmission of the predetermined number of bits of said message for terminating the activation of said temporary storage means, said encoding means and said read-out means.

2. A transponder as claimed in claim 1, wherein there are means for testing said initiating signal for frequency amplitude and duration, said means being responsive to the end of initiating signal tested and found to be valid for activating temporary storage means and said coding means, switching said coder to said trunk line to transmit said message to said line.

3. A transponder as claimed in claim 2, wherein there are a plurality of meters, memory means individual to each meter and temporary storage means individual to each meter, means for enabling each of said temporary storage means in sequence to transmit stored data therefrom to said coding means and said transmission terminating means comprises means for counting the number of pulsed bits in the sequence of messages and means responsive to said counting reaching a multiple of said predetermined number.

4. In a telephone system which has a plurality of stations, each such station having a telemetering transponder for transmitting data from a plurality of meters to a control location responsive to an initiating signal from said control location, said transponder comprising: permanent memory means individual to each of said meters and individually operable by said meters for receiving and maintaining continuously updated indications of readings of the respective meters, means responsive to said initiating signal for enabling the transponder for the non-destructive read-out of said indications from said permanent memory means, temporary storage means rendered operative by said initiating signal to receive and store indications from said permanent memory means in binary decimal form, further means rendered operative by said initiating signal for reading out indications from said temporary storage means and for encoding said read-out indications from each of said storage means into a serial message comprised of a predetermined plurality of bits of data representative of the indication of each of said meters, means rendered operative by said initiating signal for transmitting said message from said further means to said control location, and means in said transponder responsive to a change of conditions arising at said station for discontinuing said message at the time of occurrence of said change and means operative on said discontinuations for resetting said temporary storage means to their pre-enabled condition.

5. In a communications network, a system for transmitting data stored at a remote station to a central station over a communication channel in response to an actuating signal from the central station, said system including in combination: transmission means for transmitting data to the central station, receiver means coupled to the communication channel for receiving and validating the actuating signal, a plurality of data storage means positioned at the remote station, said storage means normally operative to provide permanent storage of data to be transmitted, a plurality of shift registers, each associated with a separate one of said data storage means, means responsive to said actuating signal for coupling said plurality of shift registers in series to form a transfer sequence, means responsive to the start of said actuating signal for testing said actuating signal, means responsive to an actuating signal passing the testing for causing the data stored in said plurality of data storage means to be transferred to the respective shift registers, means for coding data for transmission to said channel, means responsive to the end of an actuating signal passing said testing for coupling a first of said shift registers to the coding means for the transfer of data therefrom, means responsive to the transfer of data from said first shift registers for coding data sequentially from other of said shift registers and counter means responsive to the transfer of the last of the data from shift registers to cause the system to decouple said transmission means from the communication channel and to inactivate said read-out means and said coding means.

6. A system as claimed in claim 5, wherein there is a source of electrical power individual to said remote station, means for normally connecting said source only to the receiver means and the data storage means, and in which there are means connecting the remainder of said remote station to said power source only in response to an actuating signal passing said testing means.

7. A system as claimed in claim 6, wherein there are means for sensing the voltage at said power source, and means responsive to the voltage from said source falling below a level necessary to maintain for latching said remote station against response to an actuating signal, and means for retaining said latching means in the latched condition when the voltage at said source rises above said predetermined level.

* * * * *